Feb. 2, 1971 K. A. WILSON 3,560,917
MAGNETIC SIGNAL SENSING DEVICE FOR SELF-PROPELLED
VEHICLES AND THE LIKE
Filed Nov. 2, 1967

INVENTOR.
KENNETH A. WILSON
BY
Barnes, Kisselle, Raisch & Choate
ATTORNEYS

United States Patent Office 3,560,917
Patented Feb. 2, 1971

3,560,917
MAGNETIC SIGNAL SENSING DEVICE FOR SELF-PROPELLED VEHICLES AND THE LIKE
Kenneth A. Wilson, Locust Valley, N.Y., assignor, by mesne assignments, to American Chain & Cable Company, Inc., New York, N.Y., a corporation of New York
Filed Nov. 2, 1967, Ser. No. 680,116
Int. Cl. G08g 1/01
U.S. Cl. 340—23
24 Claims

ABSTRACT OF THE DISCLOSURE

This specification discloses a vehicle which is adapted to follow a predetermined path defined by a wire or the like embedded in the floor. The vehicles support a plurality of pickup devices which are responsive to magnetic field devices embedded in the floor past which the vehicles move. Each signal device is associated with two transformers. Each transformer comprises a primary coil associated with a high frequency source of alternating current and a secondary coil. One of the transformers is oriented with respect to the other so that it is more sensitive to the presence of a magnetic field along the path than the other transformer. Circuitry is provided for rectifying and amplifying any signal produced by the sensing of a magnetic field by said transformer pairs.

---

This invention relates to signal pickup devices and particularly to signal pickup devices for use with self-propelled vehicles.

BACKGROUND OF THE INVENTION

In the field of self-propelled vehicles wherein the vehicles wherein the vehicles sense the presence of an embedded wire or the like in the floor and follow the wire, it is desirable to produce signals at predetermined points along the path of the vehicle for controlling the path and performing other functions. Such signals may be produced by permanent or electromagnets embedded in the floor.

Among the objects of the invention are to provide pickup devices which are particularly adapted for use in association with such vehicles for detecting the presence of a magnetic field along the path of the vehicle.

Further objects of the invention are to provide such devices which are simple, low in cost, extremely sensitive and reliable.

SUMMARY

Each signal device made in accordance with the invention comprises two transformers. Each transformer comprises a primary coil associated with a high frequency source of alternating current and a secondary coil. One of the transformers is oriented with respect to the other so that it is more sensitive to the presence of a magnetic field along the path than the other transformer. Circuitry is provided for rectifying and amplifying any signal produced by the sensing of a magnetic field by said transformer pairs.

DESCRIPTION

Figure 1:
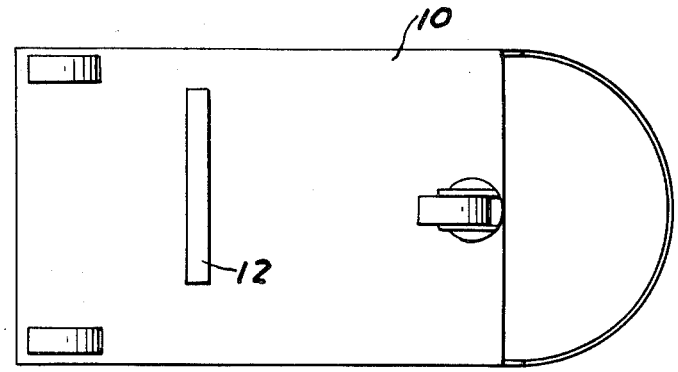
FIG. 1 is a partly diagrammatic bottom plan view of a vehicle embodying the invention.
Figure 2:
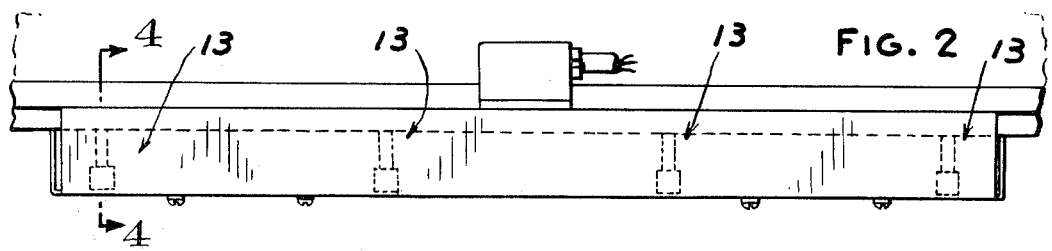
FIG. 2 is a fragmentary front elevational view of a portion of the vehicle shown in FIG. 1.
Figure 4:
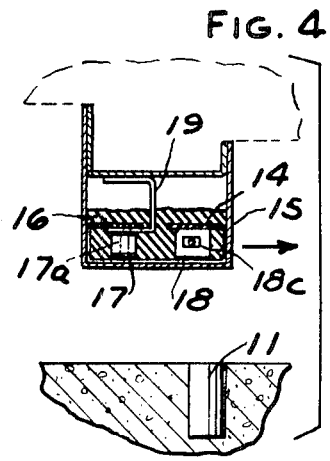
FIG. 4 is a fragmentary sectional view taken along the line 4—4 in FIG. 2.

Referring to FIG. 1 which is a bottom plan view of a self-propelled vehicle embodying the invention, the wheeled vehicle 10 has sensing means thereon (not shown) which are adapted to sense the presence of a wire embedded in the floor and cause the vehicle to follow the wire. At predetermined points along the path of the vehicle, permanent magnets 11 (FIG. 4) are embedded in the floor with their axes vertical to produce magnetic field signals which are adapted to be sensed by the vehicle and thereby cause the vehicle to perform various functions.

In accordance with the invention, a pickup bar 12 is provided beneath the vehicle and extends transversely of the vehicle. The pickup bar 12 suports a plurality of pickup devices or assemblies 13 in laterally spaced relation to the vehicle. As the vehicle moves along its path and one of the devices passes over a magnet 11, a signal is produced. A plurality of devices permits the production of a plurality of combinations of signals for producing a selection of decisions.

Figure 3:
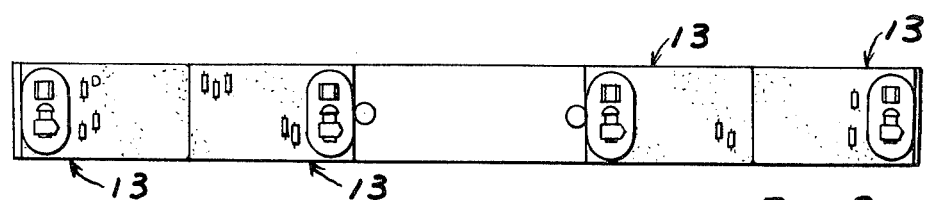
FIG. 3 is a plan view of the circuit board utilized in the device shown in FIG. 2.

As shown in FIG. 3, the sub-assemblies 13 are mounted on a single circuit board 14 which is embedded in a casing 15 by resin 16 such as epoxy resin.

Figure 6:
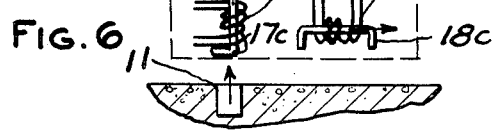
FIG. 6 is a partly diagrammatic front elevational view of a portion of the apparatus shown in FIG. 4.

Each pickup device 13 comprises two transformers or pairs of coils 17, 18 that are oriented with respect to one another in a manner such that the coil pair 17 is more sensitive than the coil pair 18 to the presence of a magnetic field from permanent magnet 11. Specifically, the loops of the coil pair 17 are wound around an axis extending generally parallel to the axis of the permanent magnets 11 while the loops of the coil pair 18 are wound around an axis extending perpendicular to the axis of the permanent magnet (FIG. 6).

Figure 5:
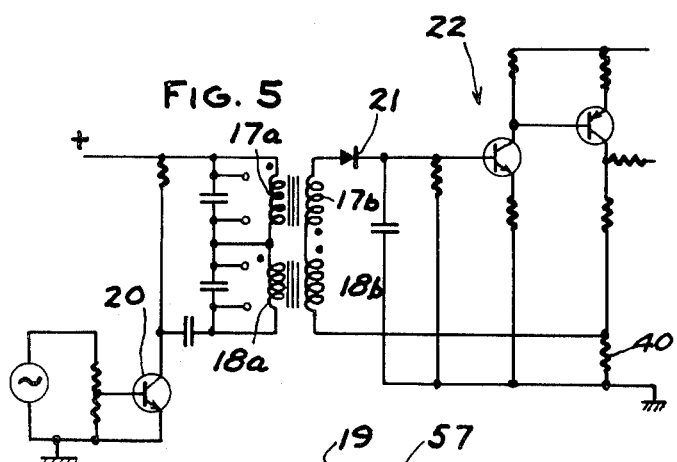
FIG. 5 is a schematic wiring diagram of a pickup device embodying the invention.

The manner in which the coils are electrically connected is more specifically shown in FIG. 5. The secondaries 17b, 18b of the coil pairs 17, 18 are connected in series and are oppositely wound while the primaries 17a, 18a of the coil pairs 17, 18 are connected in series to a source of oscillating current, preferably on the order of 500 kilocycles.

Each of the transformers or coil pairs 17, 18 has an internal core 17c, 18c, respectively, each of which is of the open loop type. The coil 17 has a high permeable magnetic material path connected to it. This path is formed by a metal strip 19 that extends to a magnetic base plate 57 of iron or the like forming a part of the casing 15, the remainder of the casing being aluminum. This path enhances the flow of magnetic signal from magnet 11 through the magnetic path of coil pair 17.

Normally, in the absence of a magnet 11, the coil pairs 17, 18 are balanced in a manner that there is no net signal. However, when a magnet 11 is present, the coupling between the primary coil 17a and the secondary coil 17b is decreased producing a net signal which is rectified by a diode 21 and amplified by two-stage amplifier 22 to produce an appropriate signal for whatever purpose it is desired. The resistor 40 provides feedback for regenerative action to provide for sharp turning on and cutting off of the circuit action. The resistor 40 provides that a portion of the output signal is added to the input signal.

I claim:
1. The combination comprising
    a plurailty of magnetic field signal devices along a predetermined path,
    a vehicle adapted to be moved along said predetermined path past said magnetic field signal devices,
    a signal sensing device on the vehicle,
    said signal sensing device comprising a pair of transformers, each said transformer comprising a primary coil and a secondary coil associated with the primary coil, a source of oscillating current connected to said primary coils, one of said transformers being oriented with respect to the other so that it is substantially more sensitive than the other to the presence of a magnetic signal from said magnetic signal devices past which the vehicle is moved, and means responsive to the change of coupling due to the presence of a magnetic signal from one of said magentic field signal devices adjacent said one transformer to produce a signal as the vehicle moves in said path.

2. The combination set forth in claim 1 including means for rectifying said signal.

3. The combination set forth in claim 1 including means for amplifying said signal.

4. The combination set forth in claim 1 including means for rectifying and amplifying said signal.

5. The combination set forth in claim 1 including an internal core associated with each said transformer, each said core being of the open loop type.

6. The combination set forth in claim 1 including an external magnetic path associated with said one secondary coil.

7. The combination set forth in claim 1 wherein the size of said core is selected such that the core material is substantially at saturation during normal operation in the presence of the magnetic field.

8. The combination set forth in claim 1 wherein said source of high frequency current supplies current at a frequency of approximately 500 kilocycles.

9. The combination set forth in claim 1 including permanent magnets positioned along the path of said vehicle and defining said magnetic field signal devices.

10. The combination set forth in claim 1 including a plurality of said signal sensing devices on said vehicle, said assemblies being positioned at laterally spaced points with respect to the vehicle.

11. The combination set forth in claim 10 wherein said primary and secondary coils and associated circuits are mounted within a casing, said casing having a portion thereof made of magnetic material, and means defining an external magnetic path from said one pair of primary and secondary coils to said magnetic portion of said casing.

12. The combination set forth in claim 11 including a resin substantially filling and holding said circuits in said metal casing.

13. The combination set forth in claim 12 wherein said circuits are substantially part of a circuit board within said casing.

14. For use on a vehicle which is moved along a predetermined path past a plurality of magnetic field signal devices, a signal sensing device for sensing the presence of a magnetic signal from said magnetic field devices, said signal sensing device comprising a pair of transformers, each said transformer comprising a primary coil and a secondary coil associated with said primary coil, a source of oscillating current connected to said primary coils, one of said transformers being oriented with respect to the other so that it is substantially more sensitive than the other to the presence of a magnetic signal past which the vehicle is moved, and means responsive to the change in coupling due to the presence of a magnetic signal from one of said magnetic field signal devices adjacent said one transformer to produce a signal as the vehicle moves in said path.

15. The combination set forth in claim 14 including means for rectifying said signal.

16. The combination set forth in claim 14 including means for amplifying said signal.

17. The combination set forth in claim 14 including means for rectifying and amplifying said signal.

18. The combination set forth in claim 14 including an external magnetic path associated with said one secondary coil.

19. The combination set forth in claim 14 wherein the size of said core is selected such that the core material is substantially at saturation during normal operation in the presence of the magnetic field.

20. The combination set forth in claim 14 wherein said source of high frequency current supplies current at a frequency of approximately 500 kilocycles.

21. The combination set forth in claim 14 including a plurality of said signal sensing devices, and means for supporting said devices in parallel relation.

22. The combination set forth in claim 21 wherein said means for supporting said plurality of devices comprises a casing, said casing having a portion thereof made of magnetic material, and means defining an external magnetic path from said one pair of primary and secondary coils to said magnetic portion of said casing.

23. The combination set forth in claim 22 including a resin substantially filling and holding said devices in said casing.

24. The combination set forth in claim 23 wherein said circuits are substantially part of a circuit board within said casing.

References Cited

UNITED STATES PATENTS

| | | | |
|---|---|---|---|
| 2,493,755 | 1/1950 | Ferrill, Jr. | 340—32X |
| 3,197,756 | 7/1965 | Maynard | 340—282X |
| 3,229,660 | 1/1966 | McLucas et al. | 235—150.2X |
| 3,368,072 | 2/1968 | Baughman | 246—182UX |

ALVIN H. WARING, Primary Examiner

U.S. Cl. X.R.

340—282; 246—63